United States Patent [19]

Slocki et al.

[11] 4,383,090
[45] May 10, 1983

[54] POLYEPOXIDE CURING BY POLYMERCAPTANS AND A REACTION PRODUCT OF AMINO ACIDS OR LACTAMS WITH AMINES

[75] Inventors: Allen T. Slocki, Plymouth, Mich.; Brian J. Carr, Fairfax, Calif.; John F. Simone, White Plains, N.Y.

[73] Assignee: Diamond Shamrock Corporation, Dallas, Tex.

[21] Appl. No.: 306,323

[22] Filed: Sep. 28, 1981

[51] Int. Cl.³ .................. C08G 59/54; C08G 59/56; C08G 59/66

[52] U.S. Cl. .................. 525/502; 252/182; 525/504; 528/109; 528/114; 528/117; 528/120; 528/323; 528/324; 528/327

[58] Field of Search ............... 525/502, 504; 528/109, 528/114, 117, 120, 327, 323, 324; 252/182

[56] References Cited

U.S. PATENT DOCUMENTS

| 2,919,255 | 12/1959 | Hart | 528/109 |
|---|---|---|---|
| 3,036,975 | 5/1962 | Taub | 528/116 |
| 3,732,309 | 5/1973 | Garnish et al. | 528/109 X |
| 4,051,195 | 9/1977 | McWhorter | 528/106 |
| 4,332,709 | 6/1982 | Kooijmans et al. | 528/114 X |

FOREIGN PATENT DOCUMENTS

| 885800 | 12/1961 | United Kingdom . |
| 1065363 | 4/1967 | United Kingdom . |

Primary Examiner—Earl A. Nielsen
Attorney, Agent, or Firm—Neal T. Levin

[57] ABSTRACT

Extremely rapid ambient curing of polyepoxide resins and mixtures of polyepoxide resins and polyacrylate esters is achieved by use of a curing system composed of at least one polymercaptan and at least one catalytic co-curing agent which is the condensation product of:
(a) aliphatic amine or substituted aliphatic amine containing at least one primary aliphatic amine group where the aliphatic moiety is ethylene or greater with
(b) at least one amino acid, its corresponding lactam or other amide forming derivative.

Optionally, known Lewis Base catalysts for the epoxy/mercaptan reaction, such as tertiary amines, may also be used.

14 Claims, No Drawings

POLYEPOXIDE CURING BY POLYMERCAPTANS AND A REACTION PRODUCT OF AMINO ACIDS OR LACTAMS WITH AMINES

BACKGROUND OF THE INVENTION

1. Field of the Invention

This invention relates to curing of polyepoxide resins and the curing of mixtures of polyepoxide resins and polyacrylate esters to produce hard, insoluble, infusible films, castings and adhesives.

2. Description of the Prior Art

Polyglycidyl ethers, particularly those prepared from a dihydric phenol such as Bisphenol A, i.e., 2,2-bis(4-hydroxyphenyl) propane, and an epihalohydrin such as epichlorohydrin, also referred to as epoxy resins, epoxide resins, polyepoxide resins or polyepoxides, have become increasingly important commercially in recent years. When cured, these thermosetting resins form insoluble, infusible films, pottings, castings, adhesives, and the like, and are markedly superior in their physical, chemical, and electrical properties to many other cured thermosetting resins. They exhibit low shrinkage during curing. The combination of hardness and toughness exhibited by the cured resins, their high adhesive strength, resistance to degradation by solvents and other chemicals and their electrical properties, such as dielectric constant and resistivity, are outstanding. At the same time, these properties can be varied within wide limits depending on the end use intended for the resin. Of the wide variety of curing agents(hardeners) and homopolymerization catalysts which have been used to cure polyepoxide resins, no one is suitable for all applications, and many have serious drawbacks no matter what the application.

Many materials are capable of curing epoxy resins at elevated temperatures, but in general, only two broad classes are sufficiently reactive to cure glycidyl ether type epoxy resins, such as the epoxynovolac resins and Bisphenol A diglycidyl ether at room temperature and below. These are mercaptans, primary and secondary polyamines and substituted amines such as the polyamidopolyamines. The cure rate of mercaptans is much faster than any other type at room temperature and below. It would be advantageous, under these conditions, to employ co-curing agents with the polymercaptan curing (hardening) agents and catalysts so that the cost would be reduced and physical properties could be varied. However, use of co-curing agents usually results in a sacrifice of gel time. That is, the formulation may lose its mercaptan cure character, becoming sluggish in gelling and development of the physical properties. In other words, the slower curing polyamines used as co-curing agents dilute the effectiveness of the catalyzed mercaptan.

Blends of primary and secondary amines and mercaptans are widely employed in the art of formulating or compounding to provide a specific balance of properties. The amine contributes improved adhesion, water resistance, rigidity and heat resistance to the cured composition, while the mercaptan contributes its unusually fast reaction or cure rate. However, the reaction rate obtained from blends of mercaptans and amines is approximately an average of the rates of the individual species and the proportion of each present. Examples of amines employed commercially as co-curing agents with mercaptans are triethylene tetramine, N-aminoethyl piperazine, commercial amido substituted polyamines such as the Genamid ® products and commercial polyamido substituted polyamines such as the Versamid ® products, both of the Henkel Corp.

U.S. Pat. No. 2,919,255—Hart—Dec. 29, 1959, describes blends of a conventional reactive polyamidopolyamine and a high molecular weight dimercaptopolysulfide polymer for curing an allyl substituted epoxy resin, employed as a side-seam cement for food containers. However, so little mercaptan was present that the composition had long pot life and slow cure at ambient temperatures and was generally cured at 180° C. This polymer had insufficient mercaptan active hydrogen to cure a significant portion of the epoxy and was used to gain flexibility, extensibility and related properties. No amino acids were used in the preparation of the polyamides.

Further, British Pat. No. 885,880 and corresponding U.S. Pat. No. 3,036,975—Taub—May 29, 1962—disclose reaction products of ε-caprolactam and polyamines such as tetraethylene pentamine to form polyamidopolyamines. The briefest mass gel time occurred in thirty minutes at room temperature. A post cure of four hours at 120° C. was used for curing. Where Versamid ® 125 (reaction product of dimerized linoleic acid and diethylene triamine) was used for comparison purposes, the cure schedule used was two hours at room temperature followed by 24 hours at 150° C. Co-curing with other hardeners such as polymercaptans is not described.

British Pat. No. 1,065,363—Tilley—Apr. 12, 1967 describes hardening agents which are reaction products of amino acids or their lactams, polyamines and dicarboxylic acids. While cure is effective at room temperature, the rate is relatively slow, i.e., 24 hours. Further, gel times (mass) even at 50° C., range from 22 to 97 minutes. Co-curing with other hardeners such as polymercaptans is not described.

SUMMARY OF THE INVENTION

A rapid, effective curing system for curing one or more polyepoxide resins or mixtures of polyepoxide resins and polyacrylate esters to form insoluble, infusible films, pottings, adhesives, castings and the like is provided by the combination or blend of at least one polymercaptan and at least one catalytic co-curing agent described below. This system, i.e., polymercaptan plus catalytic co-curing agent has been found unexpectedly to cause extremely rapid epoxy/mercaptan reactions thereby shortening the gel time, e.g., less than 6 minutes to as little as 20 seconds in 15 gram mass at room temperature without detracting from the development of the physical properties of the cured polyepoxide resin. Further these shortened gel times occur proportionately over a wide range of temperatures, i.e., at elevated temperatures, room temperature and below.

Further, the same catalytic co-curing agent plus polymercaptan blends may be used to cure blends of polyepoxide resins and polyacrylate esters mixed in ratios of 100 parts by wt. of polyepoxide resin with from about 5 to about 100 parts by wt. of polyacrylate ester. In such cases the stoichiometry is calculated by treating the acrylate ester double bond on the same basis as an epoxy group. Stoichiometry is one nitrogen active hydrogen or mercaptan active hydrogen per double bond and the suitable and preferred ratios of equivalents are the same as those described below for the epoxide alone.

The catalytic co-curing agent, also referred to hereinafter as the co-curing agent, is the reaction product of (1) amines, including substituted amines, containing at least one primary aliphatic amine group where the aliphatic moiety is ethylene or greater, with (2) at least one amino acid or its corresponding lactam, or its lower ester or its other amide-forming derivatives of the carboxyl group. Aliphatic amines may be substituted in situ. Optionally there can be present one or more mono- and/or polycarboxylic acids, and their amide forming derivatives; also other amine modifying materials can be present during the reaction; thereby forming substituted polyamines in situ. If desired, the mono- and dicarboxylic acids, and their amide-forming derivatives, and other amine modifying materials, can be pre-reacted with aliphatic primary amines, thus forming substituted aliphatic primary amines which are reacted with the amino acids, or their corresponding lactams, or their other amide forming derivatives.

There can be present from about 0.01 to about 3.0 equivalents of amine catalytic co-curing agent active hydrogen per epoxide equivalent and per equivalent of acrylate double bond, when polyacrylate is present, and preferably from about 0.1 to about 1.0 equivalent of amine catalytic co-curing agent active hydrogen per epoxide equivalent and per equivalent of acrylate double bond, when polyacrylate is present. Regarding polymercaptan, there can be used from about 0.05 to about 1.5 equivalents of mercaptan active hydrogen per epoxide equivalent, and per equivalent of acrylate double bond when polyacrylate is present, and preferably from about 0.1 to about 0.8 equivalents of mercaptan active hydrogen per epoxide equivalent and per equivalent of acrylate double bond when polyacrylate is present. Optionally other mercaptan catalysts in addition to the catalytic co-curing agent can be used. These are preferably tertiary amines and, when used, are present in amounts of from about 0.1 to about 20 parts by weight per 100 parts by weight of polyepoxide and polyacrylate ester, when present and preferably from about 0.5 to about 10 parts by weight per 100 parts by weight of polyepoxide and polyacrylate ester, when present.

The curing system is formulated by simple mixing of the catalytic co-curing agent and polymercaptan and other mercaptan catalysts, if used.

Other modifiers, e.g., fillers, plasticizers, extenders, solvents, etc., can be added to produce systems with varying consistancy and physical properties. Thereafter, the curing system is added to the polyepoxide by simple hand or mechanical mixing until all components are thoroughly blended. Depending upon the end use and the method of application, the curing system and polyepoxide component can be separately pre-heated to lower viscosity; or to attain faster gel times when ambient temperatures ae low; or pre-cooled when the fast gel time is unworkable. Pre-cooling also permits casting larger masses where exothermic heat build-up is excessive.

Depending upon the end use, the thus activated system is then cast into molds, applied by hand, machine, sprayed or flowed onto the substrate or substrates to be bonded, coated, laminated or the like.

DETAILED DESCRIPTION

Polyepoxide

Concerning the nature of the polyepoxides, these are well-known materials and the curing of same described herein is not limited to any particular polyepoxide. It is only necessary that there be more than one vicinal 1,2-epoxide group per molecule in the polyepoxide. The polyepoxide may be saturated or unsaturated, aliphatic, cycloaliphatic, aromatic or heterocyclic and may be substituted with substituents, such as chlorine, hydroxy groups, ether groups and the like. It may be monomeric or polymeric. Many polyepoxides, particularly those of the polymeric type are described in terms of their epoxy equivalent. An explanation of same appears in U.S. Pat. No. 2,633,458—Shokal—Mar. 31, 1953, (see column 3, lines 3–34). The polyepoxides used herein are those having an epoxy functionality greater than 1.0, that is to say, the number of epoxy groups per molecule according to the expression: functionality is equal to molecular weight divided by epoxide equivalent weight; is greater than one.

To obtain a rapid cure rate at room temperature or below, it is preferred that the epoxide group be activated by an adjacent electron withdrawing group as in the glycidyl ethers, glycidyl esters, glycidyl thioethers and glycidyl amines. Exemplary, although not limiting are one or more of the following epoxides.

Polyepoxides that may be used in this invention are disclosed in U.S. Pat. No. 2,633,458—Shokal—Mar. 31, 1953. Those portions of this patent which disclose examples of polyepoxides are incorporated by reference herein.

Other examples include the epoxidized esters of polyethylenically unsaturated monocarboxylic acids, such as epoxidized linseed, soybean, perilla, oiticica, tung, walnut, dehydrated castor oil, methyl linoleate, butyl linoleate, ethyl 9,12-octadecadienoate, butyl 9,12,15-octadecatrienoate, butyl eleostearate monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example:

di(2,3-epoxybutyl)adipate
di(2,3-epoxybutyl)oxalate
di(2,3-epoxyhexyl)succinate
di(3,4-epoxybutyl)maleate
di(2,3-epoxyoctyl)pimelate
di(2,3-epoxybutyl)phthalate
di(2,3-epoxyoctyl)tetrahydrophthalate
di(4,5-epoxydodecyl)maleate
di(2,3-epoxybutyl)terephthalate
di(2,3-epoxypentyl)thiodipropionate
di(5,6-epoxytetradecyl)diphenyldicarboxylate
di(3,4-epoxyheptyl)sulfonyldibutyrate
tri(2,3-epoxybutyl) 1,2,4-butanetricarboxylate
di(5,6-epoxypentadecyl)tartarate
di(4,5-epoxytetradecyl)maleate
di(2,3-epoxybutyl)azelate
di(3,4-epoxybutyl)citrate
di(5,6-epoxyoctyl)cyclohexane-1,2-dicarboxylate
di(4,5-epoxyoctadecyl)malonate.

Another group of the epoxy-containing materials includes those epoxidized esters of unsaturated alcohols and unsaturated carboxylic acids, such as:

2,3-epoxybutyl 3,4-epoxypentanoate
3,4-epoxyhexyl 3,4-epoxypentanoate
3,4-epoxycyclohexyl 3,4-epoxycyclohexanoate
3,4-epoxycyclohexyl 4,5-epoxyoctanoate 2,3-epoxycyclohexylmethyl epoxycyclohexane carboxylate.

Still another group of the epoxy-containing materials includes epoxidized derivatives of polyethylenically unsaturated polycarboxylic acids such as, for example:
dimethyl 8,9,12,13-diepoxyeicosanedioate
dibutyl 7,8,11,12-diepoxyoctadecanedioate
dioctyl 10,11-diethyl-8,9,12,13-diepoxyeicosanedioate
dihexyl 6,7,10,11-diepoxyhexadecanedioate
didecyl 9-epoxy-ethyl-10,11-epoxyoctadecanedioate
dibutyl 3-butyl-3,4,5,6-diepoxycyclohexane-1,2-dicarboxylate
dicyclohexyl 3,4,5,6-diepoxycyclohexane-1,2-dicarboxylate
dibenzyl 1,2,4,5-diepoxycyclohexane-1,2-dicarboxylate
diethyl 5,6,10,11-diepoxyoctadecyl succinate.

Still another group comprises the epoxidized polyethylenically unsaturated hydrocarbons, such as epoxidized 2,2-bis (2-cyclohexenyl) propane, epoxidized vinyl cyclohexene and epoxidized dimer of cyclopentadiene.

Another group comprises the epoxidized polymers and copolymers of diolefins, such as butadiene. Examples include butadiene-acrylonitrile copolymers, butadiene-styrene co-polymers, etc.

Another group comprises the glycidyl containing nitrogen compounds such as diglycidyl aniline, the tetraepoxide of methylene dianiline and the triepoxide of meta or para-amino phenol.

Polyepoxides particularly useful in the compositions of this invention are the glycidyl ethers of polyhydric phenols, including bisphenols and novolacs and polyhydric alcohols. The glycidyl ethers of polyhydric phenols are obtained by reacting epichlorohydrin with the desired phenols in the presence of alkali. Polyether A and Polyether B described in U.S. Pat. No. 2,633,458 are examples of polyepoxides of this type. Other examples include the diglycidyl ether of 2,2-bis (4-hydroxyphenyl)propane, the diglycidyl ether of bis (4-hydroxyphenylmethane), the polyglycidyl ether of 1,1,2,2-tetrakis (4-hydroxyphenyl) ethane (epoxy value of 0.45 eq./100 g. and melting point 85° C.), the polyglycidyl ether of 1,1,5,5-tetrakis (hydroxyphenyl)pentane (epoxy value of 0.514 eq./100 g.) and their mixtures.

Further examples of polyepoxides prepared from polyhydric phenols are novolac resins. Novolac resins are produced by reaction of formaldehyde with a phenol, for example, phenol, alkylphenol or polyhydroxy phenol. The resulting polyglycidyl ethers are then prepared by reaction of an epihalohydrin, usually epichlorohydrin, with the novolac. Useful molecular weight range for the novolacs is from about 300 to about 1,000.

Further useful polyepoxides are glycidyl ethers from polyhydric alcohols such as glycerine, pentaerythritol, 1,2,6-hexanetriol and trimethylolpropane; glycidyl esters such as diepoxides prepared from phthalic acid, tetrahydrophthalic acid, hexahydrophthalic acid and dimer acids.

Polyepoxide Blends With Polyacrylate Esters

U.S. Pat. No. 4,051,195—McWhorter—Sept. 27, 1977, describes curing of blends of diepoxide resins and polyacrylate esters of polyols with simple triamines, such as triethylene tetramine, by acrylate double bond addition polymerization, rather than the common free radical polymerization. When polyacrylates are incorporated, by simple blending, with the polyepoxides described above to form a separate component, or by blending with the curing component after addition of the polyepoxide and the system cured by the polymercaptan plus catalytic co-curing agent of this invention, unexpectedly fast gel times are achieved, being much more rapid relative to the epoxide in the absence of the polyacrylate ester. Suitable polyacrylate esters are those described in U.S. Pat. No. 4,051,195 which are incorporated by reference herein. Particularly preferred are trimethylol propane triacrylate, pentaerythritol triacrylate and pentaerythritol tetraacrylate, and the polyacrylate esters of polyepoxy resins containing aromatic substituents. The procedures for preparing these esters of epoxide resins are described in U.S. Pat. No. 3,377,406 which is incorporated by reference herein.

Polymercaptans

Polymercaptans, which along with the catalytic co-curing agent and optionally, other catalysts such as tertiary amines, are present in the curing system or curing agent component, are well-known materials and the employment of same as a co-curing agent or co-hardener herein is not limited to any specific polymercaptan.

The polymercaptan component must have a thiol functionality greater than one. Although the molecules of the polymercaptan component can contain more, e.g., up to about ten thiol groups per molecule, the polymercaptan must be virtually free from molecules having only one thiol group. However, mono-thiol compounds can be present in low amounts as modifiers and flexibilizers. Additionally the polymercaptan component should have an average molecular weight between about 100 and 20,000. Mercaptans having thiol functionalities greater than one but which have molecular weight below about 100 form products which can be undesirable because of their high volatility abd noxious odor while polymercaptans having molecular weights above about 20,000 can be highly viscous and difficult to formulate with fillers, pigments and the like.

Exemplary, although not limiting are one or more of the following polymercaptans.

Useful polymercaptans are those prepared from polyepoxides having an epoxy functionality greater than one, i.e., the number of epoxy groups contained in the average polyepoxide molecule is greater than one. Such polyepoxides are converted to polymercaptans by reaction with hydrogen sulfide or by first converting the epoxide groups to halohydrin groups and thereafter reacting the halohydrin groups with a sulfhydrate such as sodium sulfhydrate or potassium sulfhydrate.

Polyepoxides which can be used in forming the polymercaptans include the reaction product of a halogen-containing epoxide such as and epihalohydrin with an aliphatic polyhydric alcohol, e.g., glycerol, pentaerythritol, 1,2,6-hexanetriol, or 1,3,5-pentanetriol. Since secondary alcohols are formed, it is then necessary to reform the epoxide ring by further reaction with caustic. Suitable epoxides for reaction with hydrogen sulfide can also be formed by reaction between aromatic polyhydric phenols such as resorcinol, catechol or Bisphenol A and halogen-containing epoxides such as an epihalohydrin or 3-chloro-1,2-epoxybutane and by adducting a polyhydric phenol or aliphatic polyhydric alcohol with a polyepoxide compound such as bis (2,3-epoxypropyl)ether, bis (2,3-epoxy-2-methylpropyl)ether.

Other suitable polyepoxides as intermediates for polymercaptans include esters of epoxy acids and polyhydric alcohols or phenols, containing three or more hydroxyl groups, for example, esters of 2,3-epoxypropionic acid reacted with glycerol or with 1,2,6-hexanetriol and esters of 3,4-epoxybutanoic acid and polyvinyl alcohol. Other polyepoxides are the glycidyl esters from epoxy alcohols and polycarboxylic acids containing three or more carboxylic groups, e.g., triglycidyl ester of 1,2,4-butanetricarboxylic acid, triglycidyl esters of 1,3,6-hexanetricarboxylic acid and the tetraglycidyl ester of pyromellitic acid.

Polymercaptans which can be added as an admixture with polymercaptans formed from the above-described polyepoxide precursors and which for economy and efficiency advantageously form only about 50 weight percent or less of the total polymercaptan component include resins prepared from the reaction of hydrogen sulfide with polythiiranes. Other polymercaptans which can be mixed with the polymercaptans derived from the above-described precursors include epoxidized polymers and copolymers of compounds such as isoprene and butadiene which have been reacted with hydrogen sulfide across the double bond such as limonene dimercaptan as well as mercaptoethyl esters of polyacrylic acid and mercaptobutyl esters of copolymers prepared from methacrylic acid and styrene.

Preferred polymercaptans are those prepared by initially reacting a polyhydric alcohol such as 1,2,6-hexanetriol, glycerol, trimethylol propane or pentaerythritol with an alkylene oxide, such as propylene oxide or ethylene oxide, there usually being a substantial molar excess of alkylene oxide present during reaction. Thereafter the resulting polyoxyalkylene-modified polyhdyric alcohol is reacted with a halogen containing epoxide, e.g., and epihalohydrin or 3-chloro-1,2-epoxybutane, to prepare a halogenated polyhydric polyether from which the corresponding mercaptan polymer is obtained by reaction with a metallic sulfhydrate such as sodium sulfhydrate. Such resins include those disclosed in U.S. Pat. No. 3,258,495—LeFave et al—June 28, 1966. Those portions of this patent which disclose examples of polymercaptans are incorporated be reference herein. These polymercaptans usually have an average molecular weight range of from about 750 to about 7,000 and thiol functionalities between about 2.0 and about 6.

Other useful polymercaptans are those prepared from the allyl ethers of the above described polyoxyalkylene modified polyhydric alcohols as described in U.S. Pat. No. 4,092,295—Harris et al—May 30, 1978.

Other useful polymercaptans are tris(mercaptoalkyl)-cyclohexanes such as 1,2,4-tris(2-mercaptoethyl)cyclohexane and 1,3,5-tris(2-mercaptoethyl)cyclohexane.

Another group is polymercaptoalkyl esters of polycarboxylic acids containing at least eighteen carbon atoms prepared by reacting mercapto alcohols containing up to ten carbon atoms with the appropriate polycarboxylic acids such as those commonly referred to as polymeric fatty acids.

Other examples are polymercaptans having at least three mercapto substituted side chains attached to one or more aromatic rings such as the following:
1,2,3-tri(mercaptomethyl)benzene
1,2,4-tri(mercaptomethyl)benzene
1,3,5-tri(mercaptomethyl)benzene
1,3,5-tri(mercaptomethyl)-4-methyl benzene
1,2,4-tri(mercaptoethyl)-5-isobutyl benzene
1,2,3-tri(mercaptomethyl)-4,5-diethyl benzene
1,3,5-tri(mercaptomethyl)-2,6-dimethyl benzene
1,3,5-tri(mercaptomethyl)-4-hydroxy benzene
1,2,3-tri(mercaptobutyl)-4,6-dihydroxy benzene
1,2,4-tri(mercaptomethyl)-3-methoxy benzene
1,2,4-tri(mercaptoethyl)-4-aminoethyl benzene
1,3,5-tri(mercaptobutyl)-4-butoxy benzene
1,2,4,5-tetra(mercaptomethyl)-3,6-dimethyl benzene
1,2,4,5-tetra(mercaptoethyl)-3,6-dimethoxy benzene
1,2,4-tri(mercaptomethyl)-3-(N,N-dimethylamino)benzene
1,3,5-tri(mercaptobutyl)-4-(N,N-dibutylamino)benzene
1,2,4,5-tetra(mercaptomethyl)-3,6-dihydroxy benzene
3,4,5-tri(mercaptomethyl)furan
2,3,5-tri(mercaptoethyl)furan
2-butyl-3,4,5-tri(mercaptomethyl)furan
3,4,5-tri(mercaptomethyl)thiophene
2,3,5-tri(mercaptomethyl)thiophene
2-isobutyl-3,4,5-tri(mercaptoethyl)thiophene
3,4,5-tri(mercaptobutyl)pyrrole
2,3,5-tri(mercaptomethyl)pyrrole
2,4,6-tri(mercaptomethyl)pyridine
2,3,5-tri(mercaptomethyl)pyridine
2,4,6-tri(mercaptomethyl)-5-butyl pyridine
2,4,6-tri(mercaptomethyl-5-vinyl pyridine
2,3,5-tri(mercaptobutyl)-4-allyl pyridine
2,3,5-tri(mercaptomethyl)thionaphthene
2,3,5-tri(mercaptomethyl)quinoline
3,4,6-tri(mercaptomethyl)isoquinoline Other examples of these compounds include, among others, the poly(mercaptoalkyl) substituted naphthalenes, the poly(mercaptoalkyl) substituted bisphenyls, the poly(mercaptoalkyl) substituted bis(phenyl)alkanes, poly(mercaptomethyl)bis(hydroxyphenyl)alkanes, the poly(mercaptoalkyl) substituted bis(hydroxyphenyl)sulfones, poly(mercaptomethyl) substituted bis(phenyl)sulfone, the poly(mercaptoalkyl) substituted bis(hydroxyphenyl)sulfides, the poly(mercaptoalkyl) substituted bis(hydroxyphenyl)oxides, poly(mercaptoalkyl) substituted bis(phenyl)oxides, poly(mercaptoalkyl) substituted bis(chlorophenyl)alkanes and the like.

Specific examples include, among others:
4-mercaptomethylphenyl-4',5'-dimercaptomethylphenylmethane
2,2-bis(4,5-dimercaptomethylphenyl)propane
2,2-bis(4,6-dimercaptobutylphenyl)butane
4-mercaptomethylphenyl-3',4'-dimercaptomethylphenyl oxide
4-mercaptomethylphenyl-3',4'-dimercaptomethylphenyl sulfone
2,2-bis(4,5-dimercaptoethylphenyl)sulfide
the 3,4-dimercaptomethylphenyl ester of carbonic acid
the 3,4-dimercaptoethylphenyl ester of maleic acid
1,3,5-tri(mercaptomethyl)-2,4,6-trimethylbenzene
2,2-bis(3-butyl-4,5-dimercaptoethylphenyl)hexane
1,3,5-tri(4-mercapto-2-thiabutyl)benzene
1,3,5-tri(4-mercapto-2-oxabutyl)benzene
2,3-bis(4,5-dimercaptobutyl-3-chlorophenyl)butane
4-mercaptobutylphenyl-3',4'-dimercaptomethylphenyl oxide
3-mercaptobutylphenyl-2',4'-dimercaptobutylphenyl oxide Additional polymercaptans include the trioxanes, trithianes, dioxathianes, oxadithianes, oxazines, triazines, thiazines, dithiazines, dioxarsenoles, oxathiazoles, dithiazoles, triazoles, dioxalanes, isoxazoles, isothiazoles, dioxaborines, dioxazines, thiodiazines, and the like, which have at least three mercapto-substituted radicals attached to the said rings.

Specific examples of these include, among others:
2,4,6-tris(beta-mercaptoethyl)1,3,5-trioxane 2,4,6-tris(beta-mercaptoethyl)1,3,5-trithiane
2,4,6-tris(mercaptomethyl)1,3,5-trioxane
2,4,6-tris(mercaptomethyl)1,3,5-trithiane
2,4,6-tris(beta-mercaptoethyl)1,3-dioxa-5-thiane
2,4,6-tris(beta-mercaptoethyl)1-oxa-3,5-dithiane
2,4,5-tris(beta-mercaptoethyl)1,3-dioxalane
2,4,6-tris(alpha-methyl-beta-mercaptoethyl)1,3,5-trioxane
2,4,6-tris(beta-methyl-beta-mercaptoethyl)1,3,5-trithiane
2,4,6-tris(beta-mercaptobutyl)1,3,5-trioxane
2,4,6-tris(beta-mercaptohexyl)1,3,5-trithiane
2,4,6-tris(beta-phenyl-beta-mercaptoethyl)1,3,5-trioxane
2,4,6-tris(beta-cyclohexyl-beta-mercaptoethyl)1,3,5-trioxane
2,4,6-trimercapto 1,3,5-trioxane
2,4,6-trimercapto 1,3,5-trithiane
2,4,6-tris(1-thia-4-mercaptobutyl)1,3,5-trioxane
2,4,6-tris(1-oxa-4-mercaptobutyl)1,3,5-trioxane
2,3,6-tris(beta-mercaptoethyl)1,4-oxazine
2,4,6-tris(3-mercaptopropyl)1,3,5-triazine
2,4,6-tris(mercaptomethyl)1,3,5-triazine
2,4,6-tris(beta-mercaptoethyl)1-thia-3,5-diazine Examples of polymercaptans containing at least four thiol groups are polymercapto-substituted ethers such as tri(2,3-dimercaptopropyl)ether of glycerol, di(3,4-dimercaptobutyl)ether of diethylene glycol, di(2,3-dimercaptohexyl)ether of 1,4-butanediol, di(2,3-dimercaptocyclohexyl)ether of 1,5-pentanediol, tri(2,3-dimercaptopropyl)ether of 1,2,6-hexanetriol, di(2,3-dimercaptopropyl)ether of sulfonyldipropanol, di(2,3-dimercaptopropyl)ether of 1,4-dimethylolbenzene, tri(2,3-dimercaptobutyl)ether of trimethylpropane, poly(2,3-dimercaptopropyl)ether of polyallyl alcohol, di(3,4-dimercaptobutyl)ether, di(2,3-dimercaptopropyl)ether, di(2,3-dimercaptopropyl)ether of resorcinol, di(3,4-dimercaptohexyl)ether of resorcinol, tri(3,4-dimercaptoctyl)ether of 1,3,5-trihydroxybenzene, di(2,3-dimercaptopropyl)ether of 2,2-bis(4-hydroxyphenyl)propane, di(3,4-dimercaptobutyl)ether of 2,2-bis(4-hydroxyphenyl)butane, tetrakis(2,3-dimercaptopropyl)ether of 1,1,2,2-tetra(4-hydroxyphenyl)ethane, tetrakis(3,4-dimercaptobutyl)ether of 1,1,5,5-tetra(4-hydroxyphenyl)pentane, di(3,4-dimercaptohexyl)ether of 2,2-bis(4-hydroxyphenyl)sulfone, di(3,4-dimercapto butyl)ether of 2,2-bis(4-hydroxy-5-methoxyphenyl) 1,1-dichloropropane, and the like.

Other examples include the polymercapto-substituted esters, such as di(2,3-dimercaptopropyl)phthalate, di(3,4-dimercaptobutyl)tetrachlorophthalate, di(2,3-dimercaptopropyl)terephthalate, di(3,4-dimercapthexyl)adipate, di(2,3-dimercaptobutyl)maleate, di(2,3-dimercaptopropyl)sulfonyldibutyrate, di(3,4-dimercaptooctyl)thiodipropionate, di(2,3-dimercaptohexyl)citrate, di(3,4-dimercaptoheptyl)cyclohexanedicarboxylate, poly(2,3-dimercaptopropyl)ester of polyacrylic acid and poly(2,3-dimercaptohexyl)ester of polymethacrylic acid.

One of the advantages of this invention is that the polymercaptans need not be limited to those having beta activating groups to an alpha thiol such as hydroxyl, ester, phenyl and nitrile.

Catalytic Co-Curing Agent

The catalytic co-curing agent contains from about 0.1 to about 100 equivalents of aliphatic primary amine to one equivalent of amino acid carboxyl or its amide forming derivative and preferably about 0.5 to about 5.0 equivalents of aliphatic primary amine to one equivalent of amino acid carboxyl, or its amide-forming derivatives. The foregoing ratios are those present after completion of reaction during which stripping of excess volatile reactants can occur.

The catalytic co-curing agent can be prepared as follows. (1) The amino acid, its corresponding lactam or other amide-forming derivative and (2) aliphatic primary amine, including substituted aliphatic primary amine, are mixed together in amounts as specified above and reacted preferably with agitation at elevated temperatures between about 120° C. to about 320° C., preferably between about 220° C. to about 260° C. until reaction is complete. Completion is shown by attainment of the desired reactivity of the reaction product blend with polymercaptan when used to cure a test sample of polyepoxide. An inert atmosphere as supplied by a nitrogen sparge is preferred. Water or alcohol of reaction and optionally, less volatile by-products and excess amine, are removed by distillation, fractionation or by other methods well known in organic synthesis. Superatmospheric or subatmospheric pressure during reaction can be employed if desired.

Optionally, known reaction catalysts for the amide condensation or polymerization of amino acids or their lactams can be employed where it is desired to reduce the severity of reaction conditions. Specific examples of known catalysts are: phosphoric acid, alkali metal phosphates such as sodium dihydrogen phosphate, sodium hydroxide, sodium amide, sodium methoxide, boric acid, alumina and aluminum hydroxide, titanium tetrachloride and titanium and zinc alkoxides, magnesium oxide and chloride, a combination of a pyridinium salt with tributylamine and lactam derivatives such as N-acetyl caprolactam and sodium caprolactam.

Where amide substituted aliphatic primary amine is formed in situ, as in the case where one or more mono- and polycarboxylic acids, and their amide-forming derivatives are present, with unsubstituted aliphatic primary amine and amino acid, its corresponding lactam or other amide forming derivative; the reaction conditions described above are used.

Amide forming derivatives include the imidazoline forming derivatives, and are defined as derivatives of the carboxyl carbonyl of the amino acids of this invention, or of the optional mono- and polycarboxylic acids; also derivatives of the aliphatic amino nitrogen of the aliphatic amines of this invention; which when condensed, form the same amide directly as would be produced from the unmodified carboxylic acid or aliphatic amine directly. Such reactions differ only in the type, amount or absence of by-product and in the temperature, rate or degree of reaction.

Depending upon the specific reaction conditions, the amide may be produced as its reversibly cyclodehydrated form as substituted imidazoline, regardless of it formation from acid and amine, or from their derivatives.

Specific examples of amide forming derivatives of the carboxyl carbonyl of acids, with the by-products are: alkyl ester (alcohol), carboxylic acid anhydride (carbon dioxide and alcohol or water), aryl(phenyl)ester(phenols), acid halide(hydrogen halide) and acid azide(hydrazoic acid). Alkyl esters may be internally cyclized, e.g., lactones.

Examples of amide forming derivatives of the amino nitrogen of aliphatic amines are ureido(carbon dioxide), isocyanate(carbon dioxides) and nitrile.

Amide forming derivatives of amino acids are their cyclodehydrated species, e.g., lactams, N-carboanhydrides or diketopiperazines, and the partial homopolymers of amino acids and their lactams including the N-acetyl lactams.

Amides may also be considered amide forming derivatives to produce other amides by exchange reactions of carboxylic acid-A with carboxylic acid-B amide to form carboxylic acid-A amide; or exchange reactions of aliphatic amine-A with carboxylic acid amide-B to form carboxylic acid amide-A; or transamidification reactions between two amides.

Amino Acids and Lactams

The amino acids useful herein have the formula:

$$NH_2CH_2(R)_nCOOH$$

where n is zero or one and where R is a divalent hydrocarbon radical containing from 1 to 9 carbon atoms and which may be a straight or branched chain aliphatic group and may contain cycloaliphatic, heterocycyclic or aromatic substituents. The amino group may occur in any position in the chain. Lactams and other amide-forming derivatives of the carbonyl group, e.g., esters, are equally suitable. Such amino acids and lactams can be used singly or as mixtures.

Examples of amino acids are one or a mixture of β-alanine(3-aminopropionic acid), 4-aminobutyric acid, 3-aminopivalic acid, 6-aminocaproic acid, 5-aminovaleric acid, 7-aminoheptanoic acid, 8-aminooctanoic acid, 10-aminocapric acid, 9-aminostearic acid, 11-aminoundecanoic acid, 12-aminostearic acid, 12-aminolauric acid, α-glycine, α-alanine, valine, leucine, and methionine. Lower esters of the foregoing can be used as the methyl ester of 6-aminocaproic acid, the ethyl ester of 6-aminocaproic acid, butyl 7-aminoheptanoate, etc.

Examples of lactams are β-propiolactam(2-azetidinone),6-hexanolactam(ε-caprolactam), 8-octanolactam(capryllactam),Ω-laurolactam(2-azacyclotridecanone), 2-azacyclononanone, 5-ethyl caprolactam, 2-pyrrolidinone(γ-butyrolactam), methylene bis caprolactam, 2-piperidone(δ-valerolactam) and 7-heptanolactam(enantholactam). All of the foregoing are well-known materials.

Aliphatic Amines Including Substituted Aliphatic Amines

The amines, including substituted amines, must contain at least one primary aliphatic amine group where the aliphatic moiety is ethylene or greater. For convenience, these amines are categorized as monoamines and polyamines, there being, of course, in each at least one primary aliphatic amine substituent. All of these are well-known materials.

A. Aliphatic Monoamines

Useful aliphatic monoamines have the following structure:

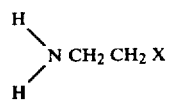

where X is H or a monovalent hydrocarbon radical containing from 1 to 22 carbon atoms which is selected from the group consisting of open chain monovalent hydrocarbon radicals, monovalent cyclic containing hydrocarbon radicals, monovalent oxygen containing hydrocarbon radicals, monovalent sulfur containing hydrocarbon radicals, monovalent nitrogen containing hydrocarbon radicals, monovalent phosphorous containing hydrocarbon radicals and monovalent halogen containing hydrocarbon radicals.

Examples of the foregoing open chain monovalent hydrocarbon radicals are straight chain, branched chain, cyclic, saturated or unsaturated monovalent radicals having from one to 22 carbon atoms such as methyl, propyl, isopropyl, octyl, isooctyl, dodecyl, hexadecyl, propenyl, octenyl; examples of cyclic containing hydrocarbon radicals are cyclohexyl, cyclohexyl ethyl, cyclopentyl and cyclohexenyl; examples of oxygen containing hydrocarbon radicals are carboxy substituted hydrocarbon radicals such as carboxyoctyl and carboxypropyl, acetyl alkoxy carbonyl acetoxy; hydroxy substituted hydrocarbon radicals such as hydroxypropyl and hydroxydecyl; alkoxy substituted hydrocarbon radicals such as methoxypropyl, methoxybenzyl ethane and propoxyoctyl; examples of sulfur containing hydrocarbon radicals are alkyl thioethers, examples of nitrogen containing hydrocarbon radicals are alkyldialkylene amino, alkylamino alkylene, alkylamido alkylene, dialkylene amido; examples of phosphorous containing hydrocarbon radicals are alkyldialkylene phospho and alkyl alkylene phospho and an example of halogen containing hydrocarbon radicals is halo alkylene.

Specific examples of the foregoing are one or a mixture of ethylamine, octylamine, isooctylamine, dodecylamine, octenylamine, cyclohexylethylamine, carboxypropylamine, hydroxypropylamine, hydroxydecylamine, methoxypropylamine, methoxyphenylethylamine, methylthiohexylamine, methylaminononylamine, ethylaminododecylamine, heptylamine 1-aminosuccinamide, aminomethylsuccinamide, 1-chlorooctylamine and 4-chlorooctylamine.

B. Aliphatic Polyamines

Useful aliphatic polyamines have the following structure:

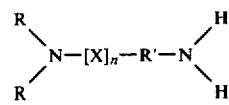

where R is H or a monovalent hydrocarbon radical containing from 1 to 22 carbon atoms which is selected from the group consisting of open chain monovalent hydrocarbon radicals, cyclic monovalent hydrocarbon radicals including those cyclic radicals formed by joining together the two R radicals which are attached to the same nitrogen atom, monovalent oxygen containing hydrocarbon radicals, monovalent sulfur containing hydrocarbon radicals, monovalent nitrogen containing hydrocarbon radicals, monovalent phosphorous containing hydrocarbon radicals and monovalent halogen substituted hydrocarbon radicals, n is 0 or 1 and where n is 1, X is a divalent hydrocarbon radical containing from 1 to 22 carbon atoms and is selected from the group consisting of open chain divalent hydrocarbon radicals, divalent cyclic hydrocarbon radicals, divalent oxygen containing hydrocarbon radicals, divalent sulfur containing hydrocarbon radicals, divalent nitrogen containing hydrocarbon radicals, divalent phosphorous containing hydrocarbon radicals and divalent halogen containing hydrocarbon radicals and R' is ethylene or alkyl substituted ethylene where alkyl can be from 1 to 10 carbon atoms.

Examples of R' are ethylene and alkyl substituted ethylenes where the alkyl can be methyl, ethyl, propyl, octyl and decyl.

Examples of R are open chain monovalent hydrocarbon radicals straight chain, branched chain, cyclic, saturated or unsaturated monovalent radicals having from 1 to 22 carbon atoms such as methyl, propyl, isopropyl, octyl, isooctyl, dodecyl, hexadecyl, propenyl, octenyl; examples of cyclic hydrocarbon radicals are cyclohexyl, cyclopentyl and cyclohexenyl; examples of oxygen containing hydrocarbon radicals are carboxy substituted hydrocarbon radicals such as carboxyoctyl and carboxypropyl, acetyl, alkoxy, carbonyl, acetoxy, hydroxy substituted hydrocarbon radicals such as hydroxypropyl and hydroxydecyl; alkoxy substituted hydrocarbon radicals such as methoxypropyl, methoxybenzyl and propoxyoctyl; examples of sulfur containing hydrocarbon radicals are alkyl thioethers, examples of nitrogen containing hydrocarbon radicals are alkyldialkylene amino, alkylamino alkylene, alkylamido alkylene, dialkylene amido; examples of phosphorous containing hydrocarbon radicals are alkyldialkylene phospho and alkyl alkylene phospho and an example of halogen containing hydrocarbon radicals is halo alkylene.

Examples of X when n is 1 are: open chain divalent hydrocarbon radicals which are straight chain, branched chain, cyclic, saturated or unsaturated divalent radicals having from one to 22 carbons such as methylene, propylene, isopropylene, octylene, isooctylene, dodecylene, hexadecylene, propenylene, octenylene, cyclohexylene, cyclopentylene, cyclohexenylene, acetyl alkylene, carbonyl oxyalkylene, acetoxyalkylene, 2-hydroxypropylene, 2-hydroxydecylene, 2-methoxypropylene, alkyl thioalkylene, alkylamino dialkylene, dialkyleneamino, alkylamido dialkylene, amido dialkylene, alkyl phospho dialkylene, phospho dialkylene, sec-haloalkylene.

Specific examples of the foregoing are one or a mixture of ethylenediamine, diethylenetriamine, pentamethylenediamine, hexamethylenediamine, triethylenetetramine, tetraethylenepentamine, pentaethylenehexamine, N,N-diethyl-1,3-propanediamine, N,N-dimethyl-1,3-propanediamine, 1,10-decanediamine, 1,5-pentanediamine, 1,18-octadecanediamine, 1,2-diaminopropane, 1,3-diaminopropane, 1,3-diaminobutane, 1,4-diaminobutane, bis-(aminoethyl)benzene, N-hydroxyethyl-ethylenediamine, N-hydroxypropyl-triethylenetetramine, N-(2-hydroxy-2,4,4-trimethylpentyl)-diethylenetriamine, N-cyanoethyl ethylenediamine, N-cyanoethyl diethylenetriamine, methylimino bis-(propylamine), poly(oxypropylene)diamine of molecular weight range of 200 to 2,000, poly(oxypropylene)-triamine of molecular weight range of 200 to 2,000, ethylenediamine monomethylamide, diethylenetriamine monoethylamide, pentamethylenediamine monoethylamide, triethylene tetramine monomethylamide, N-benzyl ethylenediamine, N-cyclohexyl ethylenediamine, diethyleneglycol bis(propylamine), bis(hexamethylene)-triamine, bis(aminopropyl)piperazine, N-aminoethyl piperazine, 3-(2-aminoethyl)aminopropylamine, N-octadecanepropylenediamine, 4-aminoethyl-1,8-diaminooctane, 9-amino-10-hydroxystearylamine, 3,9-bis(3-aminopropyl)-2,4,8,10-tetroxaspiro(5,5)undecane and 2,2,4-trimethyl and 2,4,4-trimethylhexamethylene diamines.

Where, as shown above, the aliphatic amine is in the form of substituted aliphatic amine such as amidoamine or polyamidopolyamine; or an imidazoline amine or tetrahydropyrimidine amine as a result of cyclodehydration of amidoamine or polyamidopolyamine, formation of such can be achieved either simultaneously with formation of highly active catalysts in said catalytic co-curing agent or before its use in the condensation reaction whereby catalytic co-curing agents are formed. That is, the substituted aliphatic amine is introduced along with the other reactant, viz., the amino acid, its corresponding lactam or other amide-forming derivatives of the carboxylic group, for the catalytic co-curing agent forming reaction. Alternatively, aliphatic amines can be substituted in situ during the condensation reaction, by introducing the mono and/or dicarboxylic acid or their amide-forming derivatives along with the other reactants for the reaction, viz., the aliphatic amine and amino acid.

Monocarboxylic Acids For Optionally Forming Amide Substituted Aliphatic Amines In Situ Suitable monocarboxylic acids for optional in situ formation of substituted aliphatic amines for use in preparing the catalytic co-curing agents as described above are those having from 2 to 22 carbon atoms. They may be straight or branched chain, saturated or unsaturated. Examples are: valeric acid, caproic acid, octanoic acid, decanoic acid, oleic acid, stearic acid, octadecanoic acid, octadecanoic acid, hexadecanoic acid, etc.

Included are those derived from naturally occurring oils or fats such as coconut oil acids, linseed oil acids, safflower oil acids or tall oil acids. It is preferable that the acids used should have an iodine value greater than 60 for improved solubility and lower melting point.

Also included are the synthetic branched chain secondary or iso fatty acids with 6 to 22 carbon atoms such as dimethyl hexanoic acid, 3,5,5-trimethyl hexanoic acid and dimethyl octanoic acid.

These acids can be used in the form of their functional amide-forming derivatives, e.g., methyl, ethyl, propyl or butyl esters such as the methyl ester of caproic acid. Such acids or their functional derivatives can be used singly or as mixtures.

Polycarboxylic Acids For Optionally Forming Polyamide Substituted Aliphatic Amines in Situ Suitable polybasic acids for optional in situ formation of substituted aliphatic amines for use in preparing the catalytic co-curing agents as described above include polybasic straight or branched chain, saturated and unsaturated acids of from 2 to 60 carbon atoms. These acids may be used in the form of their functional amide-forming derivatives, for example, esters. Such acids and their functional derivatives can be used singly or as mixtures.

Examples of dibasic acids are one or a mixture of cyclohexanedialkyl dicarboxylic acids, adipic acid, pimelic acid, glutaric acid, fumaric acid and azelaic acid. Useful esters are, e.g., dimethyl adipate, diethyl adipate, etc.

Examples of other polycarboxylic acids are dimerized and trimerized linoleic acids known as dimer and trimer acids, octadecadiendioic acid, eicosanedioic acid, pyromellitic acid and terephthalic acid, and other polycarboxylic acids described in U.S. Pat. No.

3,091,595—Miks—May 28, 1963. See column 2, lines 54 to 69 thereof. This portion of this patent is incorporated herein by reference. Such polycarboxylic acids may be used as mixtures with monocarboxylic acids or their amide forming derivatives.

Optional Additional Mercaptan Catalysts For Use With The Curing System

In addition to the catalytic co-curing agent and polymercaptan, i.e., the curing system, other known catalysts for the polymercaptan may be present. These are present in from about 0.1 to about 20 parts by weight per 100 parts by weight of polyepoxide or of the total of polyepoxide and polyacrylate ester, preferably from about 0.5 to about 10 parts by weight per 100 parts by weight of polyepoxide or of the total of polyepoxide and polyacrylate ester. Preferred catalysts are Lewis Bases including organic sulfides, tertiary phosphines and tertiary amines. A preferred class are the tertiary amines encompassing those compounds represented by the following formula:

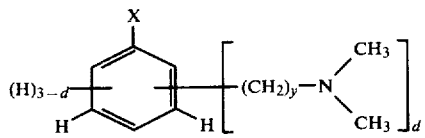

where d is an integer of from 1 to 3 inclusive, x is hydrogen or hydroxyl, and y is 1 or 2.

Included among such amines are benzyl dimethylamine; dimethylaminomethyl phenol; dimethylaminoethyl phenol; 2,4-di(dimethylaminomethyl)phenol; 2,4,6-tris(-dimethylaminomethyl)phenol; alpha methylbenzyl-dimethylamine and the like.

Other tertiary amines which are suitable are N,N-dimethylcyclohexylamine; N,N-dimethylpiperazine, N,N-dimethylamino ethanol; N-methyl diethanolamine; triethylamine; N-methyl morpholine; tetramethyl 1,3-butane diamine; tetramethylethylene diamine; 1,2,4-trimethylpiperazine; 1-methylimidazole; N-methyl-4-(2-dimethylaminoethyl)piperazine; N,N,N-tris(dimethylaminopropyl)sym-hexahydrotriazine; N-(2-dimethylaminoethyl)morpholine; octadecyl N,N-dimethylamine; hexadecyl N,N-dimethylamine and the like.

Useful sulfides can be dibutyl sulfide, dioctyl sulfide, dicyclohexyl sulfide, etc. while useful phosphines are triamyl phosphine, triphenyl phosphine, tributyl phosphine, etc.

The most preferred class are tertiary amines of the type [poly(N,N-dimethylamino)alkyl]ethers as described in U.S. Pat. No. 4,177,773—Carr—Dec. 4, 1979. Examplary of these catalysts are: bis[2-(N,N-dimethylamino)ethyl]ether; 2-(N,N-dimethylamino)ethyl 3-(N,N-dimethylamino) n-propyl ether; bis(2-dimethylamino ethyl)formal; 2,2'(ethylenedioxy bis-2-(N,N-dimethylethylamine); bis[2-(N,N-dimethylamino)-1-methyl-ethyl]ether and 2-(N,N-dimethylamino)ethyl 2-(N,N-dimethylamino)-1-methyl ethyl ether.

Optional Use of Non-Catalytic Primary And Secondary Amines As Co-Curing Agents Optionally, known non-catalytic amine co-curing agents can also be incorporated into the curing system of polymercaptan catalytic co-curing agent and optionally, known Lewis Base catalysts in amounts of from 0.05 to about 1.5 equivalents of nitrogen active hydrogen, preferably from about 0.1 to about 0.8 equivalents of nitrogen active hydrogen per epoxide equivalent and per equivalent of acrylate double bond when polyacrylate esters are present. Examples are: polyalkylene polyamines such as diethylene triamine, dipropylene triamine, bis(hexamethylene)triamine, tetraethylene pentamine, triethylene tetramine, dimethylaminopropylamine, methylimino bis(propylamine), trimethylhexamethylenediamine, fatty diamines, e.g., $C_9$ to $C_{18}$ propylene diamines, polyalkylene polyamines such as polyoxypropylene diamine and polyoxypropylene triamine, m-xylylene diamine, isophoronediamine, N-aminoethyl piperazine, bis(aminopropyl)piperazine and commercial adducted amines from epoxy resin or alkylene oxide or acrylonitrile prereacted with polyamines of type just listed. Conventional non-catalytic polyaminoamides, polyaminoimidazolines, polyamino polyamides and polyamino polyimidazolines may also be used.

Ancillary Ingredients

Curable polyepoxide compositions containing the novel catalytic co-curing agents of the present invention can also contain fillers, extenders, solvents and the like. For example, when using curable polyepoxide compositions as protective coatings, commonly used organic solvents, e.g., aromatic hydrocarbons such as benzene, toluene and xylene, ketones such as methyl ethyl ketone and methyl iso-butyl ketone, ethers such as dioxane, tetrahydrofuran, tetrahydropyran, glycol ethers, such as Cellosolve ® Acetate (Union Carbide) (ethylene glycol monoethyl ether acetate), glycol ether acetates such as Carbitol ® Acetate (Union Carbide) (diethylene glycol monoethyl ether acetate), higher polyethylene and polypropylene glycol ethers and ether esters, and the like, as well as mixtures thereof, can be present. Similarly, fillers such as silica flour, aluminum silicate, clays, asbestos, Wollastonite, barytes and aggregates, marble chips and sands; reinforcements such as glass fibers, aramid fibers, Kevlar ® fibers and carbon fibers; electrically conductive fillers or fibers; pigments such as carbon black, titanium dioxide and the like; can be employed when the curable polyepoxide compositions are used for such purposes as coatings, adhesives, or in terrazzo and sand mortar flooring or the like. Compositions may also contain amine active hydrogen promoters such as hydroxyl compounds as in alcohols and phenols. Also employed are flexibilizers such as the glycol polyglycidyl ethers, high molecular weight dimercapto polysulfide polymers such as Thiokol ® LP-3, tougheners such as epoxy terminated pre-polymers with carboxylated butadiene such as Kelpoxy ® G272-100 (Spencer Kellogg) and plasticizers such as dibutyl phthalate. The filler volume concentration can vary from about 0 percent to about 80 percent of the total system. It should be noted that care must be exercised when using ancillary materials of an acidic nature where cure retardation is not desirable.

To improve odor, a reordorant or deodorant may also be included in the formulation. Generally, from about 0.1 to about 0.7% by weight reodorant is used based upon the weight of the mercaptan.

Additionally, coupling agents for silica, alumina and fillers can be used to increase strength and durability of polymer/filler composites. Examples are epoxy, amino and mercapto substituted alkyl trialkoxy silanes and certain organo titanates.

Non-ionic surfactant compatibilizers, preferably types with limited solubility in water, may be incorporated to achieve homogeneous solutions when blending mercaptans, catalytic co-curing agents, other co-curing agents, liquid extenders and diluents with different solubility parameters and for polarity. Examples are: nonyl phenol, dinonyl phenol, capryl alcohol and the like.

For a fuller understanding of this invention, reference may be made to the following examples. These examples are given merely to illustrate the invention and are not to be construed in a limiting sense.

Except as noted, to prepare the formulations for determining gel times, the various materials as described in Systems I and II below were accurately weighed into two separate vessels, warming where necessary to achieve solution and mixing by hand. One vessel contained Component A as described below and the other vessel contained mercaptans, catalytic co-curing agents and Lewis Base mercaptan/epoxy catalysts. The two pre-blends were allowed to cool to 75±5° F. and rapidly blended with vigorous hand stirring for one minute when possible. A timer is started simultaneously with mixing. Then 3 gram and 15 gram portions of this mixture are weighed into aluminum dishes approximately 2 inches in diameter to produce an approximately 30 mil film in the case of the former and approximately 200 mil thick casting in the case of the latter. The surface of the mixture is probed with a tongue depressor until, upon touching the surface of the material, no material adheres to the tongue depressor or has developed sufficient resilience to spring back. The timer is stopped and time elapsed is taken as the gel time.

These two systems, used for determining gel time and identified as System I and System II, each contain Components A and B shown as follows:

| | SYSTEM I | | |
|---|---|---|---|
| Component | Material | Grams | Equivalents Ratio (epoxy: active hydrogen) |
| A | Epoxy resin blend | 20.00 | 1.00 |
| B | Mercaptan blend | 9.16 | 0.50 |
| B | Lewis Base catalysts | 1.01 | Not Applicable |
| B | Catalytic co-curing agent | 5.48 | Varies |
| | Total | 35.65 | |

The polyepoxide blend used in System I, unless indicated otherwise, has the following composition:

| Material | % by Weight |
|---|---|
| Phenol/formaldehyde novolac polyglycidyl ether | 45 |
| Diglycidyl ether of Bisphenol A (Diepoxide) | 33 |
| neo-pentylglycol diglycidyl ether | 22 |

The phenol/formaldehyde novolac glycidyl ether has the following structure:

where n is about 1.6, and has an epoxide equivalent weight of 176–181 and a viscosity of 20,000–50,000 cps. at 125° F.

The epoxy resin blend has an average epoxide equivalent weight of 171, an average epoxide functionality of about 2.5 and an average viscosity of 5,300 cps. at 77±2° F.

The 9.16 grams of mercaptan plus 1.01 gram Lewis Base catalysts (total 10.17 grams) was based on the following pre-blend of (a) 44.832% by weight of limonene dimercaptan, (b) 44.832% by weight of a polymercaptan based on a propylene oxide derivative of pentaerythritol of molecular weight of about 400–410 which is reacted with epichlorohydrin, the resulting epichlorohydrin adduct dehydrochlorinated with sodium hydroxide to form the polyepoxide which is converted with hydrogen sulfide to polymercaptan of molecular weight of about 870, a viscosity of approximately 15,000 cps. at 77° F., a mercaptan functionality of approximately 3 and a mercaptan equivalent weight of about 278 and characterized by a hydroxyl group beta to each of the alpha mercaptan substituents, (c) 2.491% by weight of 2-(N,N-dimethylamino)ethyl 3-(N,N-dimethylamino) n-propyl ether, (d) 7.472% by weight of 2,4,6-tris(dimethylaminomethyl)phenol and (e) 0.373% by weight of a perfumed deodorant (Veilex ® 05057 of Monsanto). This pre-blend has an average mercaptan equivalent weight of 174, an average mercaptan functionality of 2.3 and an average viscosity of 25 cps. at 77±2° F.

| | | SYSTEM II | | | |
|---|---|---|---|---|---|
| | | II (a) | | II (b) | |
| Component | Material | Grams | Equivs. Ratio | Grams | Equivs. Ratio |
| A | Diepoxide | 20.0 | 1.00 | 20.0 | 1.00 |
| B | Polymercaptan | 12.7 | 0.42 | 11.3 | 0.38 |
| B | Tertiary amine catalyst (optional) | — | n.a. | 2.2 | n.a. |
| B | Catalytic co-curing agent | 7.3 | Varies | 6.5 | Varies |
| | Total | 40.0 | | 40.0 | |

The diepoxide used in System II, was the same type as that used in System I. It is the diglycidyl ether of Bisphenol A, having a functionality of approximately 2, an epoxy equivalent weight of 182–190, and a viscosity of 11,000–14,000 cps. at 77±2° F.

The polymercaptan used in System II is based on a propylene oxide derivative of pentaerythritol of molecular weight of about 400–410 which is reacted with epichlorohydrin. The resulting epichlorohydrin adduct is dehydrochlorinated with sodium hydroxide to form the polyepoxide which is converted with hydrogen sulfide to polymercaptan of molecular weight of about 870, a viscosity of approximately 15,000 cps. at 77±2° F., a mercaptan functionality of about 3 and a mercaptan equivalent weight of about 278. It is characterized

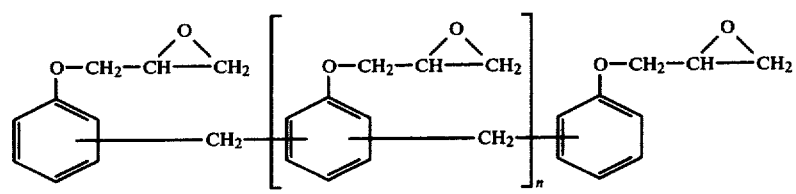

by a hydroxyl group beta to each of the alpha mercaptan substituents.

The tertiary amine catalyst used in System II is 2,4,6-tris(dimethylaminomethyl)phenol.

In all of the following examples directed to the preparation of the catalytic co-curing agent, the molar ratios of the reactants are given relative to one mole of amino acid, its lactam or other amide forming derivatives.

EXAMPLE I

This example describes the preparation of catalytic co-curing agent according to the teachings of British Pat. No. 1,065,363—Tilley—Apr. 12, 1967 using the lactam of 6-aminocaproic acid.

The following reactants in the amounts specified were used.

| Reactants | Grams | Molar Ratio |
|---|---|---|
| Tetraethylenepentamine | 74.9 | 1.75 |
| Tall oil fatty acids | 94.8 | 1.50 |
| Adipic acid | 17.4 | 0.50 |
| ε-caprolactam | 25.4 | 1.00 |

The tetraethylenepentamine and tall oil fatty acids were charged into a vessel and heated at 150° C. for two hours under nitrogen atmosphere with agitation while distilling off water of reaction. Then adipic acid was added. The temperature was increased to 170° C. and held for one hour. The caprolactam was then added and the temperature was then increased to 200° C. and held for 35 minutes. Temperature was then raised to 220° C. and held there for one hour. After this time, temperature was raised to 230° C. and maintained for two hours. Total distillate collected was 37 ml.

The gel times, using this product as the co-curing agent in System I was as follows:

3 grams—12 minutes
15 grams—5 minutes, 10 seconds

EXAMPLE II

In this example the total reaction time was the same as Example I, however, the reaction temperature was raised.

| Reactants | Grams | Molar Ratio |
|---|---|---|
| Tetraethylenepentamine | 74.9 | 1.76 |
| Tall oil fatty acids | 94.8 | 1.51 |
| Adipic acid | 17.4 | 0.53 |
| ε-caprolactam | 25.4 | 1.00 |

Tetraethylenepentamine and tall oil fatty acid were charged into the reaction vessel at room temperature and a nitrogen sparge initiated. Agitation was begun and the vessel was heated to 150° C. Once at 150° C. this temperature was maintained for a period of two hours. At this point adipic acid was charged and the temperature increased to 170° C. which was then maintained for one hour. At this point ε-caprolactam was charged and the reaction temperature increased to 210° C. which was maintained for 35 minutes. The temperatuure was then increased to 230° C. which was held for two hours. After one hour at 230° C., 25.5 mls. of distillate were collected. After the two hour holding period at 230° C. the temperature was raised to 235° C. for one hour. The reaction was stopped and cooled to 25° C. The total distillate collected was 34.5 mls.

The gel time using the above co-curing agent in System I was, 3 minutes, 20 seconds in a 15 gram mass; 10 minutes, 30 seconds in a 3 gram mass.

EXAMPLE III

The following reactants in the amounts specified were used.

| Reactants | Grams | Molar Ratio |
|---|---|---|
| Adipic acid | 66.6 | 1.0 |
| Tetraethylenepentamine | 238.6 | 3.0 |
| ε-caprolactam | 48.4 | 1.0 |

The above reactants were brought together and heated for three hours at 150° C. under nitrogen. A sample (No. 1) was removed and gel time determined. Heating was continued for three hours at 230° C. A sample (No. 2) was removed and gel time determined.

Gel time for Samples No. 1 and No. 2 as co-curing agents in System I are shown below in minutes.

| Sample No. 1 | | Sample No. 2 | |
|---|---|---|---|
| 3 grams | 15 grams | 3 grams | 15 grams |
| 13 | 9 | 4 | 2.35 |

EXAMPLE IV

In this example an acid terminated amide was prepared by reaction of an amino acid lactam with a dicarboxylic acid.

A. The following reactants in the amounts specified were used.

| Reactants | Grams | Molar Ratio |
|---|---|---|
| Adipic acid | 79.8 | 0.5 |
| ε-caprolactam | 120.2 | 1.0 |

The adipic acid and ε-caprolactam were charged in a vessel at room temperature. Agitation, heating and nitrogen flow was started. Temperature was raised to 150° C. After one-half hour at 150° C., no distillate was collected. The temperature was raised to 220° C. and held at this temperature for one-half hour and then reaction shut down over night. A sample was removed before the reaction was shut down for testing as a co-curing agent in System I. When tested, no gelling occurred within the hour.

B. The temperature of the product of Part A above was increased to 220° C. and held for thirty minutes (no distillate was collected) and then cooled to room temperature under a nitrogen blanket. Using System I, the gel time was greater than twelve hours, thus rendering this product unacceptable as a co-curing agent.

EXAMPLE V

In the following example an unsubstituted aliphatic polyamine is reacted with an amino acid lactam according to the teaching of U.S. Pat. No. 3,036,975—Taub—May 29, 1962.

| Reactants | Grams | Molar Ratio |
|---|---|---|
| Tetraethylenepentamine | 238.6 | 1.5 |
| ε-caprolactam | 96.8 | 1.0 |

Tetraethylenepentamine and ε-caprolactam in the amounts shown above were charged into a reaction vessel at room temperature. Nitrogen sparge was initiated, agitation begun and the reaction temperature raised to 175° C. which was maintained for one hour. The temperature was than raised to 240° C. and maintained at 240° C. for three hours. 40 mls. of distillate were collected. Heat was then removed and reaction product cooled to room temperature under a nitrogen blanket. Total distillate collected for this reaction was 40 ml.

Using System I, as described in Example XI, infra, the gel time at room temperature of this product in a 15 gram mass was 3 minutes, 10 seconds; in a 3 gram mass 9 minutes.

EXAMPLE VI

Seven catalytic co-curing agents were prepared from a variety of carboxylic acids, polyamines and amino acids or their lactams.

The following general procedure was used in this example.

The following was charged to a reaction vessel.

| Component |
| --- |
| Dibasic acid |
| Polyamine |
| Amino acid or its lactam |

Quantities used were in amounts to give the molar ratios specified below. The vessel was heated to 150° C. for three hours and then heated to 230° C. for three hours. A sample was removed and gel time determined. During heating, agitation was carried out and nitrogen sparge used to assist removal of water of reaction which distilled off and was condensed.

The data summarized below was obtained using the previously described procedure for preparing the catalytic co-curing agents, but varying the dibasic acid, amino acid or its lactam and aliphatic amine as indicated. Gel time was obtained using System I.

TABLE I

| Co-Curing Agent | Molar Ratio | Viscosity at 75 ± 5° F. (cps.) | Gel Time (Minutes) 3 grams | Gel Time (Minutes) 15 grams |
| --- | --- | --- | --- | --- |
| Tetraethylene pentamine | 2.95 | 14,500 | 4.0 | 2.35 |
| ε-caprolactam | 1.00 | | | |
| Adipic acid | 1.07 | | | |
| Triethylene tetramine | 3.18 | 6,700 | 6.2 | 5.5 |
| ε-caprolactam | 1.00 | | | |
| Adipic acid | 1.07 | | | |
| Tetraethylene pentamine | 2.95 | 22,250 | 4.0 | 3.5 |
| ε-caprolactam | 1.00 | | | |
| Pimelic acid | 1.07 | | | |
| Tetraethylene pentamine | 2.95 | 17,500 | 6.0 | 4.0 |
| ε-caprolactam | 1.00 | | | |
| Glutaric acid | 1.07 | | | |
| Tetraethylene pentamine | 2.46 | 56,000 | 4.0 | 2.5 |
| ε-caprolactam | 1.00 | | | |
| Fumaric acid | 1.07 | | | |
| Tetraethylene pentamine | 2.95 | 5,800 | 11.0 | 5.6 |
| ε-caprolactam | 1.00 | | | |
| Azelaic acid | 0.76 | | | |
| Tetraethylene pentamine | 2.69 | 25,000 | 3.6 | 1.9 |
| 6-Aminocaproic acid | 1.00 | | | |
| Adipic acid | 0.97 | | | |

In order to demonstrate the novel and unusual catalytic activity of the co-curing agents of this invention, the following examples show the effect of typical commercial co-curing agents in System I. Their retarding effect is clearly evident.

| Reactants | Grams | Gel Time (Minutes) 3 grams | Gel Time (Minutes) 15 grams |
| --- | --- | --- | --- |
| Epoxide blend of System I | 20.00 | 21 | 6 |
| Mercaptan and catalysts of System I | 10.17 | | |
| Co-curing agent - tetraethylene pentamine | 5.48 | | |
| Epoxide blend of System I | 20.00 | 16 | 11 |
| Mercaptan and catalysts of System I | 10.17 | | |
| Co-curing agent - commercial amido polyamine of Example XIII | 5.48 | | |

EXAMPLE VII

In the following example the reaction temperature was increased and the reaction time shortened. Also the reactants were charged at the same time.

| Reactants | Grams | Molar Ratio |
| --- | --- | --- |
| Adipic acid | 100.0 | 1.07 |
| Tetraethylenepentamine | 357.9 | 2.95 |
| ε-caprolactam | 72.6 | 1.00 |

Adipic acid, tetraethylenepentamine and ε-caprolactam in the amounts shown above were charged into a reaction vessel at room temperature, a nitrogen sparge was initiated, agitation begun and the reaction temperature raised to 150° C. which was maintained for one hour at which point 9 mls. of distillate was collected. The temperature was then raised to 175° C. and held at this temperature for one hour. After one hour at 175° C. the total distillate collected was 24.5 mls. The temperature was then raised to 240° C. and maintained there for two hours. The reaction was then stopped and product cooled to 25° C. under a nitrogen blanket. The total distillate collected for this reaction was 53.0 mls.

Using System I, the gel time of this product in a 15 gram mass was 1 minute, 35 seconds; in a 3 gram mass 2 minutes, 50 seconds.

EXAMPLE VIII

In this example using 6-aminocaproic acid, the reaction temperature was raised, the reaction time shortened compared to Example VI.

| Reactants | Grams | Molar Ratio |
| --- | --- | --- |
| Adipic acid | 40.0 | 0.97 |
| Tetraethylenepentamine | 143.2 | 2.69 |
| 6-Aminocaproic acid | 36.8 | 1.00 |

Adipic acid, tetraethylenepentamine and 6-aminocaproic acid in the amounts shown above were charged at 25° C. into a reaction vessel, a nitrogen sparge was initiated and agitation begun. The temperature was raised to 150° C. which was held for a period of one hour. The temperature was then raised to 175° C. and held for one hour. After one hour at 175° C., 17.5 mls. distillate was collected. The temperature of the reaction was then raised to 240° C. and held for two hours. The reaction was then stopped and cooled to 25° C. under a nitrogen blanket. The total amount of distillate collected for this reaction was 35.0 mls.

The gel time of this product in System I was one minute, 40 seconds for a 15 gram mass and 2 minutes, 45 seconds for a 3 gram mass.

EXAMPLE IX

The following example illustrates the use of a heterocyclic substituted, aliphatic diprimary amine: N,N'-bis(3-aminopropyl)piperazine, in the preparation of the co-curing agent.

The following reactants in the quantities disclosed were used to prepare the co-curing agent.

| Reactants | Grams | Molar Ratio |
|---|---|---|
| Adipic acid | 66.6 | 1.07 |
| N,N'—bis (3-aminopropyl) piperazine | 441.4 | 5.15 |
| ε-caprolactam | 48.4 | 1.00 |

N,N'-bis(3-aminopropyl)piperazine, 441.4 grams, were charged into a reaction vessel at room temperature and heated to 80° C. under nitrogen sparge and accompanied with agitation. Then adipic acid, 66.6 grams was charged into the reaction vessel and temperature raised to 120° C. ε-caprolactam, 48.4 grams was charged and temperature raised to 150° C. and held at 150° C. for one hour. No distillate was collected. Temperature was raised to 175° C. and held for one hour. 5 mls. of distillate were collected at this temperature. Temperature was raised to 240° C. 5 mls. of distillate were collected from 175° C. to 240° C. Temperature was held at 240° C. for two hours. 2 mls. of distillate were collected at 240° C. Total distillate collected was 12 mls.

Using the above product as a co-curing agent in System I, the gel time of a 15 gram sample was 4 minutes.

EXAMPLE X

The following example illustrates the attempted use of a cycloaliphatic amine substituted aliphatic amine, isophorone diamine (1-amino-3-aminomethyl-3,5,5-trimethylcyclohexane), in the preparation of the co-curing agent.

The following reactants in the quantities disclosed were used to prepare the co-curing agent.

| Reactants | Grams | Molar Ratio |
|---|---|---|
| Adipic acid | 66.6 | 1.07 |
| Isophorone diamine | 444.4 | 6.10 |
| ε-caprolactam | 48.4 | 1.00 |

The adipic acid, isophorone diamine and ε-caprolactam were charged in the amounts shown above into a reaction vessel at room temperature. The contents of the vessel were then heated to 150° C. under nitrogen sparge and accompanied by agitation. At 100° C., the reaction product crystallized and solidified. Further heating caused emission of a dense, acrid vapor. No distillate was collected.

Using the above product as a co-curing agent in System I, the gel time of a 15 gram sample was 28 minutes indicating no catalytic effect. Hence, use of this type of amine is outside of the scope of this invention.

EXAMPLE XI

In this example, Versamid ® 140 (Henkel) a high molecular weight polyimidazoline substituted aliphatic polyamine with a viscosity of 15,000 cps. at 75° F. and an amine value of 370–400 is used.

Versamid ® 140 is given as the reaction product of one mole of dimerized linoleic acid and two moles of triethylenetetramine in the book "Epoxy Resin Technology" by P. F. Bruins, Editor (1968), page 80, published by Interscience Publishers and further described in U.S. Pat. Nos. 3,002,941 and 3,139,437 to Peterson, June 30, 1964. Versamid ® 140, 220 grams, was charged in a reaction vessel and heated to 100° C., under nitrogen sparge and accompanied by agitation. At this temperature ε-caprolactam, 161.2 grams, was added to the reaction vessel and temperature raised to 175° C. Temperature was held at 175° C. for one hour. No distillate was collected. Temperature was then raised to 240° C. No distillate was collected during this time. The temperature was held at 240° C. for three hours. 4 mls. of distillate were collected at this temperature. Then heat was removed and reaction vessel cooled to room temperature. Nitrogen sparge was maintained. The total distillate collected was 4 mls.

Gel times were determined using System I and the co-curing agent of this example are given below. In this instance, System I had the following composition.

| Component | Material | Grams | Equivalents Ratio |
|---|---|---|---|
| A | Epoxy resin | 20.00 | 1.00 |
| B | Mercaptan blend | 9.16 | 0.50 |
| B | Lewis Base catalysts | 1.01 | Not Applicable |
| B | Catalytic co-curing agent | 5.83 | Varies |
| | Total | 36.00 | |

Gel times were, for 15 gram mass, 1 minute, 55 seconds and for a 3 gram mass, 2 minutes, 20 seconds.

EXAMPLE XI (a)

In this example the effect of modification of polyepoxide with a polyacrylate ester is shown. The catalytic co-curing agent and formulation of Example XI was used except that instead of the epoxy resin blend of System I there was substituted 90 percent by weight (18 grams) of the diglycidyl ether of Bisphenol A, described in detail as the diepoxide of System II and 10 percent of trimethylolpropane triacrylate (2 grams). The mixed epoxide plus acrylate double bond equivalent weight of these two materials equaled the epoxide equivalent weight of the System I polyepoxide blend of 174.

In the first experiment, a pre-blend of epoxy and acrylate was weighed into the pre-blended curing components at ambient temperature and stirring begun. After 5 seconds a rapid heat build-up was observed and the material was cast within 7 seconds. 10 seconds after commencing mixing gel occurred in the 15 gram mass. This gel had a "cheesey" character which toughened slightly over night and had become hard and tough 2 weeks later. Due to the extremely fast reaction rate mixing did not appear complete.

In the second experiment, the 18 grams of diepoxide was first weighed into the curing agent component and stirred for 45 seconds, then 2 grams of trimethylol propane triacrylate added, followed by continued mixing for 15 seconds and casting of a 15 gram mass. Gel occurred in 1 minute, 20 seconds to produce a uniform polymer with the consistency of gum rubber and lacking the "cheesey" character noted in the first experiment. This was tough and flexible after standing over night and became tough and hard when examined two weeks later.

These experiments demonstrate an unexpected additional increase in reaction rate of epoxy/mercaptan reaction in the presence of even minor quantities of acrylate double bond.

EXAMPLE XII

In this example, Versamid® 125 (Henkel) a high molecular weight polyamido substituted aliphatic polyamine with a viscosity of 50,000 cps. at 77°±2° F. and an amine value of 330–360 is used.

Versamid® 125 is given as the reaction product of one mole of dimerized linoleic acid and two moles of diethylenetriamine in the book "Epoxy Resin Technology" by P. F. Bruins, Editor (1968), page 80, published by Interscience Publishers and further described in U.S. Pat. No. 2,705,223—Renfrew—Mar. 29, 1955. Versamid® 125, 220 grams, were charged at room temperature in a reaction vessel. Nitrogen sparge and agitation were started. The vessel was heated to 100° C. and ε-caprolactam, 161.2 grams, were charged to the vessel. Temperature was raised to 175° C. and held at this temperature for one hour. Temperature was then raised to 240° C. and held at this temperature for three hours. Heat was removed and the reaction vessel was allowed to cool to room temperature. Nitrogen sparge was maintained.

No distillate was recovered when temperature was 240° C. and below. However, 2.5 mls. distillate was collected during the three hours that the temperature was maintained at 240° C.

Gel times were determined at 25° C. using System I with the product of this example as the co-curing agent. Gel times were, for 15 gram mass, 3 minutes, 20 seconds and for a 3 gram mass, 6 minutes, 10 seconds.

EXAMPLE XIII

In this example a commercial monoamide substituted aliphatic polyamine with a low degree of cyclodehydration, which is the reaction product of 40 percent by weight (1 mole) of tetraethylene pentamine and 60 percent by weight (1 mole) of tall oil fatty acids (low red titre), is used according to the teaching of U.S. Pat. No. 3,085,075—Lockshin—Apr. 9, 1963.

The above substituted amine, 220 grams, (0.67 mole) was charged at room temperature in a reaction vessel. Nitrogen sparge and agitation were started. The vessel was heated to 100° C. and ε-caprolactam, 161.2 grams, (1 mole) was charged to the vessel. Temperature was raised to 175° C. (no distillate collected) and held at this temperature for one hour. Temperature was then raised to 240° C. and held at this temperature for three hours. 12 mls. of distillate were collected. Heat was removed and the reaction vessel was allowed to cool to room temperature. Nitrogen sparge was maintained. Total distillate collected was 12 mls.

Using System I as described in Example XI, gel times were determined at room temperature with the product of this example as the co-curing agent. Gel times were, for 15 gram mass, 2 minutes, 40 seconds and for a 3 gram mass, 5 minutes.

EXAMPLE XIV

In the following example, the lactam of 4-aminobutyric acid, 2-pyrrolidinone, was used.

| Reactants | Grams | Molar Ratio |
| --- | --- | --- |
| Adipic acid | 66.6 | 1.07 |
| Tetraethylenepentamine | 238.6 | 2.95 |
| 2-Pyrrolidinone | 36.4 | 1.00 |

Adipic acid, tetraethylenepentamine and 2-pyrrolidinone were charged in the amounts shown above into a reaction vessel at room temperature. Nitrogen sparge was initiated, agitation begun and the reaction temperature raised to 150° C. which was maintained for one hour. No distillate was collected. The temperature was then raised to 175° C. during which time 7 mls. of distillate were collected. Temperature was held at 175° C. for one hour. At this temperature, 5 mls. of distillate were collected. The temperature was then raised to 240° C. and maintained for two hours. 18 mls. of distillate were collected. Heat was then removed and reaction product cooled to room temperature under a nitrogen blanket. The total distillate collected for this reaction was 30.0 mls.

Using System I, as described in Example XI, the gel time at room temperature of this product in a 15 gram mass was 2 minutes, 5 seconds; in a 3 gram mass 3 minutes, 10 seconds.

EXAMPLE XV

In the following example 2-azacyclotridecanone, the lactam of 12-amino lauric acid, was used.

| Reactants | Grams | Molar Ratio |
| --- | --- | --- |
| Adipic acid | 28.4 | 1.16 |
| Tetraethylenepentamine | 189.2 | 5.98 |
| 2-Azacyclotridecanone | 33.0 | 1.00 |

Adipic acid, tetraethylenepentamine and 2-azacyclotridecanone were charged in the amounts shown above into a reaction vessel at room temperature. Nitrogen sparge was initiated, agitation begun and the reaction temperature raised to 175° C. which was maintained for one hour. The temperature was then raised to 240° C. and held at this temperature for two hours. Heat was then removed and reaction product cooled to room temperature under a nitrogen blanket. The total distillate collected for this reaction was 9.0 mls.

Using System I, the gel time at room temperature of this product in a 15 gram mass was 3 minutes, 35 seconds; in a 3 gram mass, 6 minutes, 30 seconds.

EXAMPLE XVI

In the following example the amino acid β-alanine was used.

| Reactants | Grams | Molar Ratio |
| --- | --- | --- |
| Adipic acid | 66.6 | 1.12 |
| Tetraethylenepentamine | 238.6 | 3.09 |
| β-alanine | 36.4 | 1.00 |

Adipic acid, tetraethylenepentamine and β-alanine were charged in the amounts shown above into a reaction vessel at room temperature. Nitrogen sparge was initiated, agitation begun and the reaction temperature raised to 150° C. which was maintained for one hour. The temperature was then raised to 175° C. and held at 175° C. for one hour. At this temperature, 17.0 mls. of distillate were collected. The temperature was then raised to 240° C. and maintained at 240° C. for two hours. 23.0 mls. of distillate were collected. Heat was then removed and reaction product cooled to room temperature under a nitrogen blanket. The total distillate collected for this reaction was 40.0 mls.

Using System I, the gel time at room temperature of this product in a 15 gram mass was two minutes, 20 seconds; in a 3 gram mass, 4 minutes.

EXAMPLE XVII

The following example describes use of mixtures of polymercaptan and co-curing agent in varying proportions in the curing of polyepoxide. The polyepoxide was the polyepoxide blend of System I, the polymercaptan was the polymercaptan plus tertiary amines of System I and the co-curing agent was the co-curing agent described in Example VII. There was used 20 parts by weight of polyepoxide blend with 16 parts by weight of a blend of polymercaptan and catalytic co-curing agent pre-blended in the percentages by weight shown in Table II. Gel times are reported in the same table.

Stoichiometry was calculated from the theoretical aliphatic amine active hydrogen present (excluding the amide active hydrogen which does not react with epoxy groups as is well known in epoxy technology) based on the amine present in the initial charge minus the water of condensation from amide formation (1 mole per mole of amide) and minus the water of cyclodehydration due to imidazoline formation (1 mole per mole of imidazoline).

The total stoichiometry is the ratio of equivalents of amine active hydrogen plus the equivalents of mercaptan active hydrogen to one equivalent of epoxide, expressed as a percentage.

FORMULATION B

In this formulation System II (b) was prepared. 2,4,6-tris (dimethylaminomethyl) phenol was present as a co-catalyst.

FORMULATION C

For comparison purposes, Formulation B was repeated but the co-curing agent was omitted.

Gel times are reported below:

| Formulation | 15 Gram Gel Time (Min., Sec.) | 3 Gram Gel Time (Min., Sec.) |
|---|---|---|
| A | 1' 30" | 4' |
| B | 1' 50" | 2' 10" |
| C | 3' 30" | 4' |

This shows that even in the presence of an amount of 2,4,6-tris (dimethylaminomethyl) phenol designed to provide maximum cure rate, the addition of the catalytic co-curing agent further accelerated the rate whereas conventional co-curing agents retard the rate.

EXAMPLE XIX

In the following a triamine was condensed with a dicarboxylic acid and 2-pyrrolidinone, the lactam of 4-aminobutyric acid.

| Reactants | Grams | Molar Ratio |
|---|---|---|
| Diethylenetriamine | 183.4 | 2.0 |
| Adipic acid | 64.9 | 0.5 |
| 2-Pyrrolidinone | 75.6 | 1.0 |

Diethylenetriamine, in the amounts shown above,

TABLE II

| POLYMERCAPTAN PLUS TERTIARY AMINES OF SYSTEM I | | CO-CURING AGENT OF EXAMPLE VII | | | | |
|---|---|---|---|---|---|---|
| Ratio (%) | Fractional Stoichiometry (%) | Ratio (%) | Fractional Stoichiometry (%) | Total Stoichiometry (%) | 15 Gram Mass Gel Time (Min., Sec.) | 3 Gram Film Gel Time (Min., Sec.) |
| 100 | 78 | 0 | 0 | 78 | 5' 40" | 9' 00" |
| 95 | 75 | 5 | 16 | 91 | 4' 05" | 7' 03" |
| 90 | 71 | 10 | 32 | 103 | 3' 35" | 5' 45" |
| 85 | 67 | 15 | 47 | 114 | 2' 55" | 3' 55" |
| 80 | 63 | 20 | 63 | 126 | 2' 30" | 3' 26" |
| 75 | 59 | 25 | 79 | 138 | 1' 25" | 3' 22" |
| 70 | 55 | 30 | 95 | 150 | 2' 10" | 2' 43" |
| 65 | 51 | 35 | 110 | 161 | 1' 57" | 2' 25" |
| 60 | 47 | 40 | 126 | 173 | 1' 50" | 2' 24" |
| 55 | 43 | 45 | 142 | 185 | 1' 47" | 2' 25" |
| 50 | 39 | 50 | 158 | 197 | 1' 45" | 2' 28" |
| 45 | 35 | 55 | 173 | 208 | 1' 55" | 3' 41" |
| 40 | 32 | 60 | 189 | 221 | 2' 22" | 4' 55" |
| 30 | 24 | 70 | 221 | 245 | 3' 35" | 8' 55" |
| 20 | 16 | 80 | 252 | 268 | 9' 25" | 14' 40" |
| 0 | 0 | 100 | 315 | 315 | 2 hrs. 30 min. | 3 hrs. 10 min. |

EXAMPLE XVIII

Using System II, the gel times at room temperature of the following formulations were determined. In the first two formulations, the co-curing agent of Example VII was used.

FORMULATION A

In this formulation System II (a) was prepared. No additional catalyst was present.

was charged into a reaction vessel at room temperature and heated to 75°-80° C. under nitrogen sparge and accompanied with agitation. Then adipic acid and 2-pyrrolidinone in the amounts shown above were charged into the reaction vessel and the temperature raised to 175° C. This temperature was maintained for one hour. 29 mls. of distillate were collected at 175° C. Temperature was raised to 240° C. An additional 65 mls. of distillate were collected between 175° to 240° C. Temperature was maintained at 240° C. for one hour. 43 mls. of distillate were collected at 240° C. Total distillate collected was 137 mls. The amine values of the distillates indicated that the excess diethylene triamine had distilled over with water.

Using System I, the 36 gram mass gelled in the mixing vessel after 20 seconds of hand stirring. The reaction ratio was so fast that it was not possible to produce completely homogeneous 3 gram and 15 gram films for comparative gel time determination.

EXAMPLE XX

Using the product of Example XIX, gel times were determined using the polyepoxide of System I and the uncatalyzed polymercaptan of System II, i.e., no additional catalyst was present.

The amounts of material used were polyepoxide blend, 20 parts by weight; uncatalyzed polymercaptan 10.17 parts by weight and catalytic co-curing agent 5.48 parts by weight.

The gel time at 25° C. of 15 gram mass was 40 seconds; of a 3 gram mass, 45 seconds.

EXAMPLE XXI

In the following example, an alpha-amino acid derivative, glycine anhydride (2,5-piperazinedione), was used.

| Reactants | Grams | Molar Ratio |
|---|---|---|
| Diethylenetriamine | 90.4 | 4 |
| Adipic acid | 32.0 | 1 |
| Glycine anhydride | 25.0 | 1 |

Diethylenetriamine, in the amount shown above, was charged into a reaction vessel at room temperature and heated to 75°–80° C. under nitrogen sparge and accompanied with agitation. Then adipic acid and glycine anhydride in the amounts shown above were charged into the reaction vessel and the temperature raised to 175° C. This temperature was maintained for one hour during which time distillate was collected. Temperature was raised to 240° C. and maintained at 240° C. for one hour. A total of 50 mls. of distillate were collected.

Using System I (14.6 grams of the catalytic co-curing agent of this example, 25.4 grams of pre-catalyzed mercaptan and 20 grams of polyepoxide blend), a 15 gram mass gelled in 1 minute, 35 seconds at room temperature.

EXAMPLE XXII

In this example, the lactam of 4-aminobutyric acid was used.

| Reactants | Grams | Molar Ratio |
|---|---|---|
| Diethylenetriamine | 147.4 | 1.25 |
| Adipic acid | 83.5 | 0.5 |
| 2-Pyrrolidinone | 97.3 | 1.0 |

Diethylenetriamine, in the amount shown above, was charged into a reaction vessel at room temperature and heated to 75°–80° C. under nitrogen sparge and accompanied with agitation. Then adipic acid and 2-pyrrolidinone in the amounts shown above were charged into the reaction vessel and the temperature raised to 175° C. This temperature was maintained for one hour. 15 mls. of distillate were collected at 175° C. Temperature was raised to 240° C. and maintained for two hours. Heat was then removed and the reaction product cooled to room temperature under a nitrogen blanket. Total distillate collected was 88 mls.

Using System I, the gel time at room temperature of this product in a 15 gram mass was 20 seconds accompanied by exothermic heat.

The cure rate, indicated by the development of hardness, was determined by use of a Barcol Hardness Tester Model 935 (Plastics Model) on the top surface of an approximately 0.2 inch (15 gram) mass in an aluminum weighing dish. It was read every two minutes up to fifteen minutes, while maintaining casting in a 77° F.±5° F. atmosphere. Data obtained is shown below.

| BARCOL HARDNESS DEVELOPMENT | |
|---|---|
| Elapsed Time After Mixing (Minutes) | Reading |
| 7 | 50–55 |
| 9 | 65–70 |
| 11 | 70–75 |
| 13 | 75–80 |
| 15 | 79–83 |

EXAMPLE XXIII

In this example, the lactam of 4-aminobutyric acid was used.

| Reactants | Grams | Molar Ratio |
|---|---|---|
| Triethylenetetramine | 468.0 | 2.0 |
| Adipic acid | 116.9 | 0.5 |
| 2-Pyrrolidinone | 136.2 | 1.0 |

Triethylenetetramine, in the amount shown above, was charged into a reaction vessel at room temperature and heated to 75°–80° C. under nitrogen sparge and accompanied with agitation. Then adipic acid and 2-pyrrolidinone in the amounts shown above were charged into the reaction vessel and the temperature raised to 175° C. This temperature was maintained for one hour. 38 ml. of distillate were collected at 175° C. Temperature was raised to 240° C. and maintained for two hours. Heat was then removed and the reaction product cooled to room temperature under a nitrogen blanket. Total distillate collected was 188 ml.

Using System I, the gel time at 25° C. of this product in a 15 gram mass was 1 minute, 40 seconds and of a 3 gram mass, 2 minutes, 10 seconds.

While the invention has been described with reference to certain specific embodiments thereof, it is understood that it is not to be so limited since alterations and changes may be made therein which are within the full intended scope of the appended claims.

What is claimed is:

1. A curing system for epoxy resins and mixtures of epoxy resins and polyacrylate esters comprising:
   (a) at least one polymercaptan, and
   (b) at least one catalytic co-curing agent which is the reaction product of:
      (i) at least one amine containing at least one primary aliphatic amine substituent where the aliphatic moiety is ethylene or greater with
      (ii) at least one member of the group consisting of amino acid, its corresponding lactam and amide forming derivatives of same.

2. The curing system of claim 1 wherein there is from about 0.01 to about 3.0 equivalents of amine active hydrogen of catalytic co-curing agent per epoxide equivalent and per equivalent of acrylate double bond where polyacrylate is present and from about 0.05 to about 1.5 equivalents of mercaptan active hydrogen of polymercaptan per epoxide equivalent and per equivalent of acrylate double bond where polyacrylate is present.

3. The curing system of claim 1 wherein said component (i) is selected from the group consisting of:

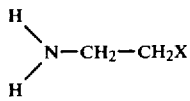

where X is H or a monovalent hydrocarbon radical containing from 1 to 22 carbon atoms which is selected from the group consisting of open chain monovalent hydrocarbon radicals, monovalent cyclic hydrocarbon radicals, monovalent oxygen containing hydrocarbon radicals, monovalent sulfur containing hydrocarbon radicals, monovalent nitrogen containing hydrocarbon radicals, monovalent phosphorous containing hydrocarbon radicals and monovalent halogen containing hydrocarbon radicals, and

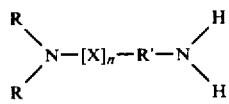

where R is H or a monovalent hydrocarbon radical containing from 1 to 22 carbon atoms which is selected from the group consisting of open chain monovalent hydrocarbon radicals, monovalent cyclic hydrocarbon radicals including those cyclic radicals formed by joining together the two R radicals which are attached to the same nitrogen atom, monovalent oxygen containing hydrocarbon radicals, monovalent sulfur containing hydrocarbon radicals, monovalent nitrogen containing hydrocarbon radicals, monovalent phosphorous containing hydrocarbon radicals, and monovalent halogen containing hydrocarbon radicals, where n is 0 or 1, and where n is 1, X is a divalent hydrocarbon radical containing from 1 to 22 carbon atoms and is selected from the group consisting of open chain divalent hydrocarbon radicals, divalent cyclic hydrocarbon radicals, divalent oxygen containing hydrocarbon radicals, divalent sulfur containing hydrocarbon radicals, divalent nitrogen containing hydrocarbon radicals, divalent phosphorous containing hydrocarbon radicals and divalent halogen containing hydrocarbon radicals and R' is ethylene or alkyl substituted ethylene where alkyl can be from 1 to 10 carbon atoms.

4. The curing system of claim 1 wherein said amine is the reaction product of at least one of mono- and polycarboxylic acid and amide forming derivatives thereof with amine containing at least one primary aliphatic amine substituent.

5. The curing system of claim 1 wherein there is present tertiary amine in an amount up to about 20 parts by weight per 100 parts by weight of polyepoxide or of polyepoxide and polyacrylate ester where polyacrylate ester is present.

6. The curing system of claim 1 wherein there is present from about 0.1 to about 100 equivalents of component (i) per one equivalent of component (ii).

7. The curing system of claim 1 wherein said component (i) is obtained from diethylene triamine and adipic acid and said component (ii) is 2-pyrrolidinone.

8. The curing system of claim 1 wherein said component (i) is obtained from triethylene tetramine and adipic acid and said component (ii) is 2-pyrrolidinone.

9. The curing system of claim 1 wherein said component (ii) is ε-caprolactam.

10. A curable epoxy resin composition comprising at least one polyepoxide and a curing system comprising:
  (a) at least one polymercaptan, and
  (b) at least one co-curing agent which is the reaction product of:
    (i) at least one aliphatic amine containing at least one primary aliphatic amine substituent where the aliphatic moiety is ethylene or greater with
    (ii) at least one member of the group consisting of amino acid, its corresponding lactam and amide forming derivatives of same.

11. The curable epoxy resin composition of claim 10 wherein there is from about 0.01 to about 3.0 equivalents of amine active hydrogen of catalytic co-curing agent per epoxide equivalent and per equivalent of acrylate double bond where polyacrylate is present and from about 0.05 to about 1.5 equivalents of mercaptan active hydrogen per epoxide equivalent and per equivalent of acrylate double bond where polyacrylate is present.

12. A substantially insoluble and infusible product which is the reaction product of a polyepoxide composition comprising at least one polyepoxide or mixtures of at least one polyepoxide and polyacrylate ester and a curing system comprising:
  (a) at least one polymercaptan, and
  (b) at least one co-curing agent which is the reaction product of:
    (i) at least one aliphatic amine containing at least one primary aliphatic amine substituent where the aliphatic moiety is ethylene or greater with
    (ii) at least one member of the group consisting of amino acid, its corresponding lactam and amide forming derivatives of same.

13. The composition of claim 12 wherein there is from about 0.01 to about 3.0 equivalents of amine active hydrogen of catalytic co-curing agent per epoxide equivalent and per equivalent of acrylate double bond where polyacrylate is present and from about 0.05 to about 1.5 equivalents of mercaptan active hydrogen per epoxide equivalent and per equivalent of acrylate double bond where polyacrylate is present.

14. A process for curing polyepoxide comprising mixing together and reacting at least one polyepoxide or mixtures of at least one polyepoxide and polyacrylate ester with a curing system comprising:
  (a) at least one polymercaptan, and
  (b) at least one catalytic co-curing agent which is the condensation product of:
    (i) at least one aliphatic amine containing at least one primary aliphatic amine substituent where the aliphatic moiety is ethylene or greater with
    (ii) at least one member of the group consisting of amino acid, its corresponding lactam and amide forming derivatives of same.

* * * * *